(12) United States Patent
Sun et al.

(10) Patent No.: US 11,605,967 B2
(45) Date of Patent: Mar. 14, 2023

(54) ON-BOARD CHARGER

(71) Applicant: Delta Electronics (Shanghai) Co., Ltd., Shanghai (CN)

(72) Inventors: Hao Sun, Shanghai (CN); Minli Jia, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 154 days.

(21) Appl. No.: 17/144,184

(22) Filed: Jan. 8, 2021

(65) Prior Publication Data
US 2021/0296922 A1  Sep. 23, 2021

(30) Foreign Application Priority Data
Mar. 23, 2020 (CN) .......................... 202010207338.X

(51) Int. Cl.
*H02J 7/02* (2016.01)
(52) U.S. Cl.
CPC ..................... *H02J 7/02* (2013.01)
(58) Field of Classification Search
CPC .......... B60L 53/22; B60L 58/00; B60L 53/00; B60L 53/30; B60L 58/25; H02J 7/02; H02J 7/022
See application file for complete search history.

(56) References Cited

U.S. PATENT DOCUMENTS

| | | | |
|---|---|---|---|
| 6,137,704 A | 10/2000 | Ito et al. | |
| 2005/0024023 A1 | 2/2005 | Chang | |
| 2016/0172992 A1 | 6/2016 | Tallam et al. | |
| 2020/0083727 A1* | 3/2020 | Sun | H02J 7/00 |
| 2020/0321796 A1* | 10/2020 | Chang | H02M 1/10 |

(Continued)

FOREIGN PATENT DOCUMENTS

| | | | |
|---|---|---|---|
| CN | 207124568 U | 3/2018 | |
| CN | 208548840 U | 6/2018 | |
| CN | 108809138 A * | 11/2018 | H02M 7/797 |

(Continued)

OTHER PUBLICATIONS

Extended European Search Report for EP Application No. 21151424.5, dated Jun. 21, 2021.

(Continued)

*Primary Examiner* — Richard Isla
*Assistant Examiner* — Sadia Kousar
(74) *Attorney, Agent, or Firm* — Nixon Peabody LLP

(57) ABSTRACT

The present disclosure provides an on-board charger including a power supply terminal, a switching circuit, a first bridge arm, a second bridge arm, a third bridge arm, a fourth bridge arm, a first bus capacitor, a second bus capacitor, a first switch and a control circuit. The present disclosure can realize a compatibility of a single-phase power supply input or a three-phase power supply input through the cooperation of the switching circuit with the control circuit. Meanwhile, the number of bus capacitors is reduced in the operating state of the single-phase power supply input, accordingly not only the volume and cost of the on-board charger can be reduced, but also the charging power of the on-board charger can be increased, which has an advantage of strong applicability.

18 Claims, 3 Drawing Sheets

(56) References Cited

U.S. PATENT DOCUMENTS

2021/0061114 A1* 3/2021 Sun ........................ H02J 7/02
2021/0245628 A1* 8/2021 Zu ......................... B60L 58/25

FOREIGN PATENT DOCUMENTS

| | | | |
|---|---|---|---|
| CN | 108809138 | A | 11/2018 |
| CN | 109713676 | A | 1/2019 |
| CN | 109842287 | A | 6/2019 |
| CN | 109861357 | A | 6/2019 |
| CN | 110233514 | A | 8/2019 |
| CN | 110460140 | A | 11/2019 |
| DE | 102018208264 | A1 * | 11/2019 |
| DE | 102018208264 | A1 | 11/2019 |

OTHER PUBLICATIONS

CN Office Action for Application No. 202010207338.X, dated Apr. 6, 2021.
CN Search Report for Application No. 202010207338.X, dated Apr. 6, 2021.

* cited by examiner

ON-BOARD CHARGER

CROSS REFERENCE TO RELATED APPLICATION

The present application claims priority to Chinese Patent Application No. 202010207338.X, entitled "On-Board Charger", filed on Mar. 23, 2020, the content of which is incorporated herein by reference in its entirety.

TECHNICAL FIELD

The present disclosure relates to the field of on-board charging technology, and more particularly to an on-board charger.

BACKGROUND

With the increasing popularity of electric vehicles, more and more on-board power supply products are developing towards high efficiency, high power density, high reliability and low cost. At the same time, in order to reduce the cost and the volume, the power supply modules are continuously developing towards integration.

With the continuous increase of the endurance of the electric vehicle, the power of the on-board charger is also increased. In order to meet a requirement of a charging power of the on-board charger, a single/three-phase compatible on-board charger will gradually become the mainstream of the charger market in the future. However, the charging power of the existing single/three-phase compatible on-board charger can only be supported to 6.6 KW during the single-phase input. That is, the existing single/three-phase compatible on-board charger cannot meet the requirement of a user due to the low charging power during the single-phase input. The development of a charger having a high power and a single/three-phase compatible characteristic is the current development tendency. Therefore, it is necessary to provide a new circuit topology to meet the requirement of a high-power output in the case of the single-phase input.

SUMMARY

In view of this, it is necessary to provide a new on-board charger solution to address the problem that the charging power of the existing single/three-phase compatible on-board charger is too low during the single-phase input.

The present disclosure provides an on-board charger, which includes:

a power supply terminal including a first node, a second node, a third node, and a neutral node;

a switching circuit, wherein a first end of the switching circuit is electrically connected to the first node, a second end of the switching circuit is electrically connected to the second node, and a third end of the switching circuit is electrically connected to the third node;

a first bridge arm, wherein a first end of the first bridge arm is electrically connected to a positive voltage bus, a second end of the first bridge arm is electrically connected to a negative voltage bus, and a third end of the first bridge arm is electrically connected to a fourth end of the switching circuit;

a second bridge arm, wherein a first end of the second bridge arm is electrically connected to the positive voltage bus, a second end of the second bridge arm is electrically connected to the negative voltage bus, and a third end of the second bridge arm is electrically connected to a fifth end of the switching circuit;

a third bridge arm, wherein a first end of the third bridge arm is electrically connected to the anode bus, a second end of the third bridge arm is electrically connected to the cathode bus, and a third end of the third bridge arm is electrically connected to a sixth end of the switching circuit;

a fourth bridge arm, wherein a first end of the fourth bridge arm is electrically connected to the positive voltage bus, a second end of the fourth bridge arm is electrically connected to the negative voltage bus, and a third end of the fourth bridge arm is electrically connected to the neutral node;

a first bus capacitor, wherein a first end of the first bus capacitor is electrically connected to the positive voltage bus;

a second bus capacitor, wherein a first end of the second bus capacitor is electrically connected to a second end of the first bus capacitor, and a second end of the second bus capacitor is electrically connected to the negative voltage bus;

a first switch, wherein a first end of the first switch is electrically connected to the third end of the fourth bridge arm, and a second end of the first switch is electrically connected to the second end of the first bus capacitor and the first end of the second bus capacitor; and a control circuit configured to control the switching circuit, the first bridge arm, the second bridge arm, the third bridge arm, and the first switch to operate.

In some embodiments, the switching circuit includes:

a second switch, wherein a first end of the second switch is electrically connected to the first node, and a second end of the second switch is electrically connected to the third end of the first bridge arm through a first inductor;

a third switch, wherein a first end of the third switch is electrically connected to the second node, and a second end of the third switch is electrically connected to the third end of the second bridge arm through a second inductor;

a fourth switch, wherein a first end of the fourth switch is electrically connected to the third node, and a second end of the fourth switch is electrically connected to the third end of the third bridge arm through a third inductor; and a fifth switch, wherein a first end of the fifth switch is electrically connected to the first node, and a second end of the fifth switch is electrically connected to the second end of the third switch.

In some embodiments, when a single-phase power supply is electrically connected to the power supply terminal, the control circuit controls the second switch, and the fifth switch to turn on, and controls the third switch and the fourth switch to turn off, and the control circuit controls the first switch to turn off; and when a three-phase power supply is electrically connected to the power supply terminal, the control circuit controls the second switch, the third switch and the fourth switch to turn on, and controls the fifth switch to turn off, and the control circuit controls the first switch to turn on.

In some embodiments, when the single-phase power supply is electrically connected to the power supply terminal, the control circuit controls the first bridge arm and the second bridge arm to operate alternatively.

In some embodiments, the switching circuit further includes:

a sixth switch, wherein a first end of the sixth switch is electrically connected to the first node, and a second end of the sixth switch is electrically connected to the second end of the fourth switch.

In some embodiments, when the single-phase power supply is electrically connected to the power supply terminal, the control circuit controls the sixth switch to turn on; and when the three-phase power supply is electrically connected to the power supply terminal, the control circuit controls the sixth switch to turn off.

In some embodiments, when the single-phase power supply is electrically connected to the power supply terminal, the control circuit controls the first bridge arm, the second bridge arm, and the third bridge arm to operate alternatively.

In some embodiments, the fourth bridge arm includes:

an upper bridge arm switch, wherein a first end of the upper bridge arm switch is electrically connected to the positive voltage bus, and a second end of the upper bridge arm switch is electrically connected to the neutral node and the first end of the first switch; and a lower bridge arm switch, wherein a first end of the lower bridge arm switch is electrically connected to the second end of the upper bridge arm switch, and a second end of lower bridge arm switch is electrically connected to the negative voltage bus.

In some embodiments, the upper bridge arm switch includes at least one of a first controllable switch and a first diode; and the lower bridge arm switch includes at least one of a second controllable switch and a second diode.

In some embodiments, the on-board charger further includes:

a fifth bridge arm, wherein a first end of the fifth bridge arm is electrically connected to the positive voltage bus, a second end of the fifth bridge arm is electrically connected to the negative voltage bus, and a third end of the fifth bridge arm is electrically connected to the fourth end of the switching circuit through a fourth inductor;

a sixth bridge arm, wherein a first end of the sixth bridge arm is electrically connected to the positive voltage bus, a second end of the sixth bridge arm is electrically connected to the negative voltage bus, and a third end of the sixth bridge arm is electrically connected to the fifth end of the switching circuit through a fifth inductor; and a seventh bridge arm, wherein a first end of the seventh bridge arm is electrically connected to the positive voltage bus, a second end of the seventh bridge arm is electrically connected to the negative voltage bus, and a third end of the seventh bridge arm is electrically connected to the sixth end of the switching circuit through a sixth inductor.

In some embodiments, when a single-phase power supply is electrically connected to the power supply terminal, the control circuit controls the first bridge arm, the second bridge arm, the third bridge arm, the fifth bridge arm, the sixth bridge arm and the seventh bridge arm to operate alternatively; and when a three-phase power supply is electrically connected to the power supply terminal, the control circuit controls the first bridge arm and the fifth bridge arm to operate alternatively, and controls the second bridge arm and the sixth bridge arm to operate alternatively, and controls the third bridge arm and the seventh bridge arm to operate alternatively.

In some embodiments, when a single-phase power supply is electrically connected to the power supply terminal, the control circuit controls the first bridge arm, the second bridge arm, the fifth bridge arm and the sixth bridge arm to operate alternatively; and when a three-phase power supply is electrically connected to the power supply terminal, the control circuit controls the first bridge arm and the fifth bridge arm to operate alternatively, and controls the second bridge arm and the sixth bridge arm to operate alternatively, and controls the third bridge arm and the seventh bridge arm to operate alternatively.

In some embodiments, each of the fifth bridge arm, the sixth bridge arm, and the seventh bridge arm includes an upper bridge arm switch and a lower bridge arm switch connected in series.

In some embodiments, the on-board charger further includes:

a first filter capacitor, wherein a first end of the first filter capacitor is electrically connected to the fourth end of the switching circuit, and a second end of the first filter capacitor is electrically connected to the neutral node;

a second filter capacitor, wherein a first end of the second filter capacitor is electrically connected to the fifth end of the switching circuit, and a second end of the second filter capacitor is electrically connected to the neutral node; and a third filter capacitor, wherein a first end of the third filter capacitor is electrically connected to the sixth end of the switching circuit, and a second end of the third filter capacitor is electrically connected to the neutral node.

In some embodiments, each of the first bridge arm, the second bridge arm, and the third bridge arm includes an upper bridge arm switch and a lower bridge arm switch connected in series.

In some embodiments, the switching circuit further includes:

a resistor, wherein a first end of the resistor is electrically connected to the first node; and a seventh switch, wherein a first end of the seventh switch is electrically connected to a second end of the resistor, and a second end of the seventh switch is electrically connected to the second end of the second switch.

Compared to the prior art, the above-mentioned on-board charger can be compatible with a single-phase power supply input or a three-phase power supply input through the cooperation of the switching circuit and the control circuit. Meanwhile, by adding the fourth bridge arm on the basis of the first bridge arm, the second bridge arm and the third bridge arm, to cooperate with the first switch, the first bus capacitor and the second bus capacitor, the number of bus capacitors is reduced in the operating state of the single-phase power supply input, accordingly not only the volume and cost of the on-board charger can be reduced, but also the charging power of the on-board charger can be increased, which has an advantage of strong applicability.

10, on-board charger;
101, power supply terminal; A, first node; B, second node; C, third node; N, neutral node;
110, switching circuit; 111, second switch; 112, third switch;
113, fourth switch; 114, fifth switch; 115, sixth switch;
116, seventh switch; R, resistor;
100, first bridge arm;
200, second bridge arm;
300, third bridge arm;
400, fourth bridge arm; 410, first switch; 411, first diode;
420, second switch; 421, second diode;
500, first switch;
600, control circuit;
700, fifth bridge arm;
800, sixth bridge arm;
900, seventh bridge arm;
Cup, first bus capacitor; Cdn, second bus capacitor;
C1, first filter capacitor; C2, second filter capacitor; C3, third filter capacitor;
L1, first inductor; L2, second inductor; L3, third inductor; L4, fourth inductor; L5, fifth inductor; L6, sixth inductor.

DETAILED DESCRIPTION OF THE EMBODIMENTS

In order to make the above-mentioned objectives, features and advantages of the present disclosure clearer and easier to understand, the specific embodiments of the present disclosure will be described in detail with reference to the accompanying drawings. For the sake of fully understanding of the present disclosure, many specific details are set forth in the following description. However, the present disclosure can be implemented in many other ways different from those described herein. A person skilled in the art can make similar improvements without departing from the principle of the present disclosure, thus the present disclosure should not be limited by the specific implementations disclosed below. Unless otherwise defined herein, all technical and scientific terms used herein have the same meaning as commonly understood by a person skilled who belongs to the technical field of the present disclosure. For example, an electric connection may refer to a direct electric connection, or an indirect electric connection through other elements. The terms used in the description of the present disclosure are only for describing specific embodiments, rather than limiting the present disclosure.

Figure 1:
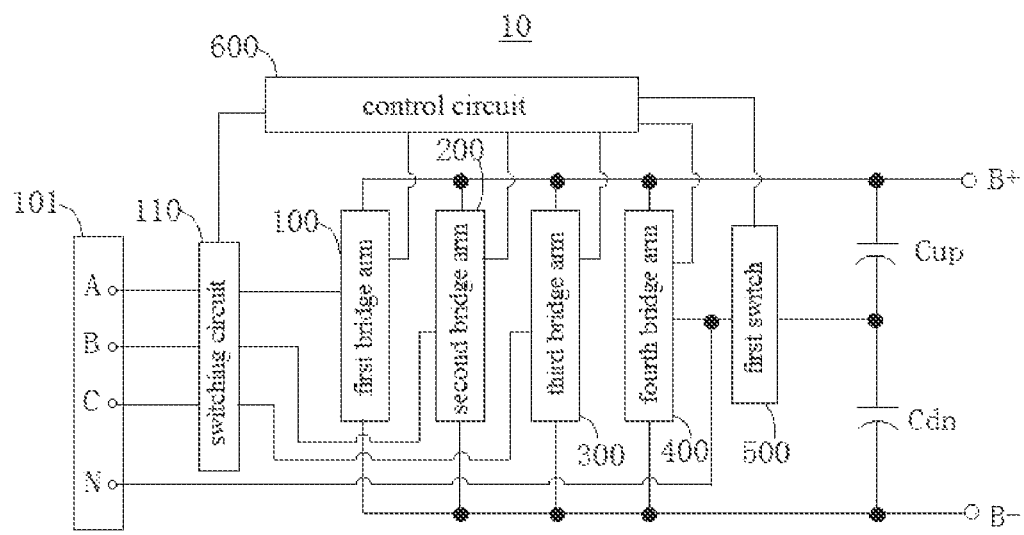
FIG. 1 is a circuit block diagram illustrating an on-board charger according to an embodiment of the present disclosure.

Referring to FIG. 1, an embodiment of the present application provides an on-board charger 10 which includes a power supply terminal 101, a switching circuit 110, a first bridge arm 100, a second bridge arm 200, a third bridge arm 300, a fourth bridge arm 400, a first bus capacitor Cup, a second bus capacitor Cdn, a first switch 500, and a control circuit 600. The power supply terminal 101 includes a first node A, a second node B, a third node C, and a neutral node N. A first end of the switching circuit 110 is electrically connected to the first node A, a second end of the switching circuit 110 is electrically connected to the second node B, and a third end of the switching circuit 110 is electrically connected to the third node C. A first end of the first bridge arm 100 is electrically connected to a positive voltage bus B+, a second end of the first bridge arm 100 is electrically connected to a negative voltage bus B−, and a third end of the first bridge arm 100 is electrically connected to a fourth end of the switching circuit 110. A first end of the second bridge arm 200 is electrically connected to the positive voltage bus B+, a second end of the second bridge arm 200 is electrically connected to the negative voltage bus B−, and a third end of the second bridge arm 200 is electrically connected to a fifth end of the switching circuit 110. A first end of the third bridge arm 300 is electrically connected to the positive voltage bus B+, a second end of the third bridge arm 300 is electrically connected to the negative voltage bus B−, and a third end of the third bridge arm 300 is electrically connected to a sixth end of the switching circuit 110. A first end of the fourth bridge arm 400 is electrically connected to the positive voltage bus B+, a second end of the fourth bridge arm 400 is electrically connected to the negative voltage bus B−, and a third end of the fourth bridge arm 400 is electrically connected to the neutral node N. A first end of the first bus capacitor Cup is electrically connected to the positive voltage bus B+. A first end of the second bus capacitor Cdn is electrically connected to a second end of the first bus capacitor Cup, and a second end of the second bus capacitor Cdn is electrically connected to the negative voltage bus B−. A first end of the first switch 500 is electrically connected to the third end of the fourth bridge arm 400, and a second end of the first switch 500 is electrically connected to the second end of the first bus capacitor Cup and the first end of the second bus capacitor Cdn. The control circuit 600 is configured to control the switching circuit 110, the first bridge arm 100, the second bridge arm 200, the third bridge arm 300 and the first switch 500 to operate.

In the present embodiment, the power supply terminal 101 can be configured to electrically connect an external alternating current (AC) power supply, such as a single-phase power supply or a three-phase power supply. The switching circuit 110 can consist of a combination of multiple intelligent switches or a relay switch combination. The first switch 500 can be an intelligent switch or a relay switch. The control unit 600 controls the operation of the switching circuit 110 according to the type of the AC power supply, so that the on-board charger 10 can be compatible with the single-phase power supply input and the three-phase power supply input, and can charge an on-board battery. Specifically, when the single-phase power supply is electrically connected to the power supply terminal 101, the on-board charger 10 operates in a single-phase mode. When the three-phase power supply is electrically connected to the power supply terminal 101, the on-board charger 10 operates in a three-phase mode. The first bridge arm 100, the second bridge arm 200, the third bridge arm 300, and the fourth bridge arm 400 are connected in parallel between the positive voltage bus B+ and the negative voltage bus B−; and each of the first bridge arm 100, the second bridge arm 200, and the third bridge arm 300 includes an upper bridge arm switch and a lower bridge arm switch connected in series. A connection point of the upper bridge arm switch and the lower bridge arm switch can be a third end of a corresponding bridge arm. Both the upper bridge arm switch and the lower bridge arm switch include a controllable switch, for example, an Insulated Gate Bipolar Transistor (IGBT) or a Metal-Oxide-Semiconductor Field-Effect Transistor (MOSFET), both the IGBT and MOSFET can include a body diode. The four bridge arms cooperate with the first switch 500, the first bus capacitor Cup, and the second bus capacitor Cdn, such that the number of bus capacitors is reduced when the on-board charger 10 operates in the single-phase mode, thereby reducing the volume and cost of the on-board charger 10.

Figure 2:
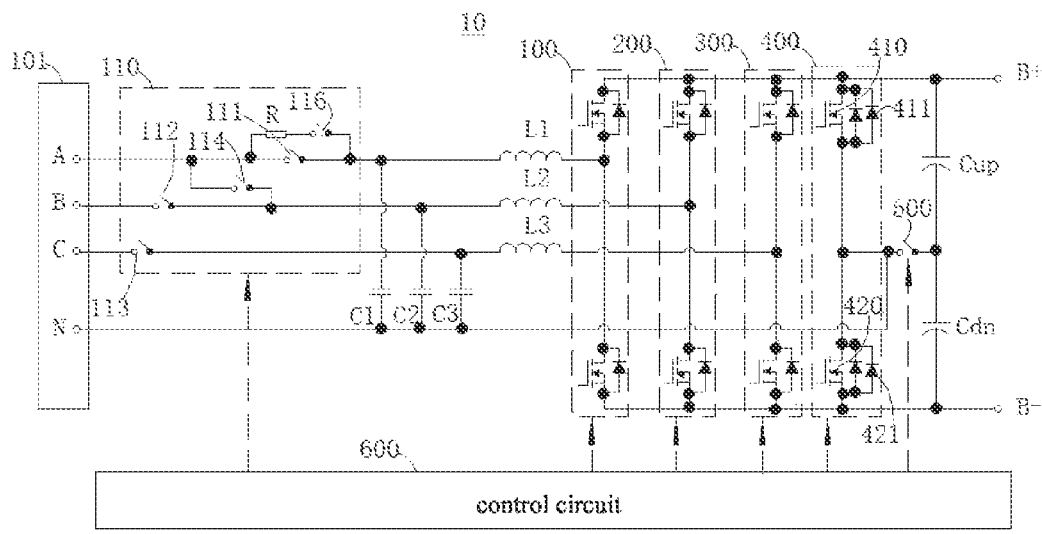
FIG. 2 is a schematic circuit diagram I of an on-board charger according to an embodiment of the present disclosure.

In some embodiments, as shown in FIG. 2, the switching circuit 110 includes a second switch 111, a third switch 112, a fourth switch 113, and a fifth switch 114. A first end of the second switch 111 is electrically connected to the first node A, and a second end of the second switch 111 is electrically connected to the third end of the first bridge arm 100 through a first inductor L1. A first end of the third switch 112 is electrically connected to the second node B, and a second end of the third switch 112 is electrically connected to the third end of the second bridge arm 200 through a second inductor L2. A first end of the fourth switch 113 is electrically connected to the third node C, and a second end of the fourth switch 113 is electrically connected to the third end of the third bridge arm 300 through a third inductor L3. A first end of the fifth switch 114 is electrically connected to the first node A, and a second end of the fifth switch 114 is electrically connected to the second end of the third switch 112, i.e., is electrically connected to the third end of the second bridge arm 200 through the second inductor L2. Each of the second switch 111, the third switch 112, the fourth switch 113, and the fifth switch 114 can be a relay switch or an intelligent switch. The first inductor L1, the second inductor L2, and the third inductor L3 serves a filter inductor.

When the single-phase power supply is electrically connected to the power supply terminal 101, the control circuit 600 can control the second switch 111 and the fifth switch 114 to turn on, and control the third switch 112 and the fourth switch 113 to turn off, and the control circuit 600 controls the first switch 500 to turn off. That is, the first node A is electrically connected to the third end of the first bridge arm 100 and the third end of the second bridge arm 200, and the neutral node N is electrically connected to the third end of the fourth bridge arm 400. At this time, the control circuit 600 controls the first bridge arm 100 and the second bridge arm 200 to operate alternatively, to reduce a ripple current, thereby reducing the number of the filter capacitors. Operating frequencies of the first bridge arm 100 and the second bridge arm 200 are high frequencies, for example, 40 KHz. The control circuit 600 controls the fourth bridge arm 400 to operate. The operating frequency of the fourth bridge arm 400 is a low frequency, for example, a power grid frequency of 50/60 Hz. Both the first bridge arm 100 and the second bridge arm 200 are fast bridge arms, and the fourth bridge arm 400 is a slow bridge arm. The first bridge arm 100 and the fourth bridge arm 400 are equivalent to a full-bridge circuit, and the second bridge arm 200 and the fourth bridge arm 400 are equivalent to a full-bridge circuit, accordingly the number of the bus capacitors is reduced. The on-board charger 10 can charge at 6.6 KW in the single-phase mode. When the three-phase power supply is electrically connected to the power supply terminal 101, the control circuit 600 can control the second switch 111, the third switch 112 and the fourth switch 113 to turn on, and control the fifth switch 114 to turn off, and the control circuit 600 controls the first switch 500 to turn on. That is, the first node A is electrically connected to the third end of the first bridge arm 100, the second node B is electrically connected to the third end of the second bridge arm 200, the third node C is electrically connected to the third end of the third bridge arm 300, and the neutral node N is electrically connected to the third end of the fourth bridge arm 400 and a connection point of the first bus capacitor Cup and the second bus capacitor Cdn. The connection point can be a midpoint of the bus capacitors. The on-board charger 10 can charge at 11 KW in the three-phase mode.

Figure 3:
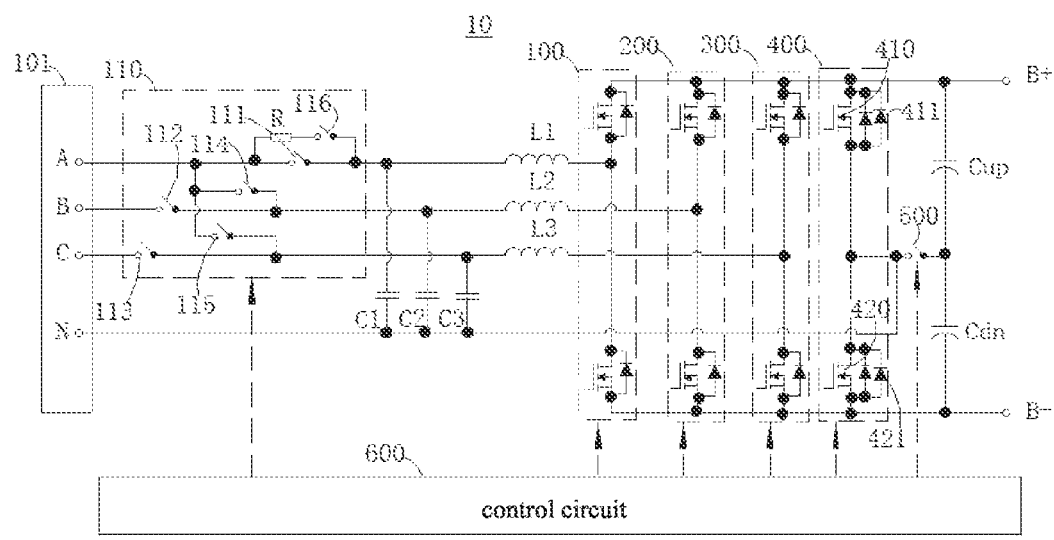
FIG. 3 is a schematic circuit diagram II of an on-board charger according to an embodiment of the present disclosure.

In some embodiments, as shown in FIG. 3, the switching circuit 110 can further include a sixth switch 115 which can be a relay switch or an intelligent switch. A first end of the sixth switch 115 is electrically connected to the first node A, and a second end of the sixth switch 115 is electrically connected to the second end of the fourth switch 113, that is, connected to the third end of the third bridge arm 300 through the third inductor L3. When the single-phase power supply is electrically connected to the power supply terminal 101, the control circuit 600 can control the second switch 111, the fifth switch 114 and the sixth switch 115 to turn on, and control the third switch 112 and the fourth switch 113 to turn off, and the control circuit 600 controls the first switch 500 to turn off. That is, the first node A is electrically connected to the third end of the first bridge arm 100, the third end of the second bridge arm 200 and the third end of the third bridge arm 300. At this time, the control circuit 600 controls the first bridge arm 100, the second bridge arm 200 and the third bridge arm 300 to operate alternatively, for example, to operate alternatively at 120 degree. Similar to the embodiment shown in FIG. 2, the first bridge arm 100, the second bridge arm 200 and the third bridge arm 300 are fast bridge arms, and the fourth bridge arm 400 is a slow bridge arm. The on-board charger 10 can charge at 11 KW in the single-phase mode, thereby increasing the charging power of the on-board charger 10. When the three-phase power supply is electrically connected to the power supply terminal 101, the control circuit 600 can control the second switch 111, the third switch 112 and the fourth switch 113 to turn on, and control the fifth switch 114 and the sixth switch 115 to turn off; and the control circuit 600 controls the first switch 500 to turn on. That is, the first node A is connected to the third end of the first bridge arm 100, the second node B is electrically connected to the third end of the second bridge arm 200, the third node C is electrically connected to the third end of the third bridge arm 300, and the neutral node N is electrically connected to the third end of the fourth bridge arm 400 and the connection point of the first bus capacitor Cup and the second bus capacitor Cdn. The on-board charger 10 can charge at 11 KW in the three-phase mode.

In the above embodiments, as shown in FIG. 2 and FIG. 3, the fourth bridge arm 400 can include an upper bridge arm switch and a lower bridge arm switch connected in series. Specifically, a first end of the upper bridge arm switch is electrically connected to the positive voltage bus B+, and a second end of the upper bridge arm switch is electrically connected to the neutral node N and the first end of the first switch 500. A first end of the lower bridge arm switch 420 is electrically connected to the second end of the upper bridge arm switch 410, and a second end of lower bridge arm switch 420 is electrically connected to the negative voltage bus B−.

The upper bridge arm switch includes a first controllable switch 410 and a first diode 411 connected in parallel, and the lower bridge arm switch includes a second controllable switch 420 and a second diode 421 connected in parallel. A cathode of the first diode 411 is electrically connected to a first end of the first controllable switch 410 and the positive voltage bus B+, and an anode of the first diode 411 is electrically connected to a second end of the first controllable switch 410. A cathode of the second diode 421 is electrically connected to the first end of the second controllable switch 420 and the anode of the first diode 411, and an anode of the second diode 421 is electrically connected to the second end of the second controllable switch 420 and the negative voltage bus B−. The control circuit 600 implements the operation of the fourth bridge arm by controlling the first controllable switch 410 and the second controllable switch 420 to turn on or turn off. The first controllable switch 410 can be an IGBT, an MOSFET, or a Bipolar Junction Transistor (BJT). At this time, the fourth bridge arm 400 can cooperate with the first bridge arm 100, the second bridge arm 200 or the third bridge arm 300 to implement a bidirectional operation, which can not only realize a charging function, but also realize a discharging function.

Figure 4:
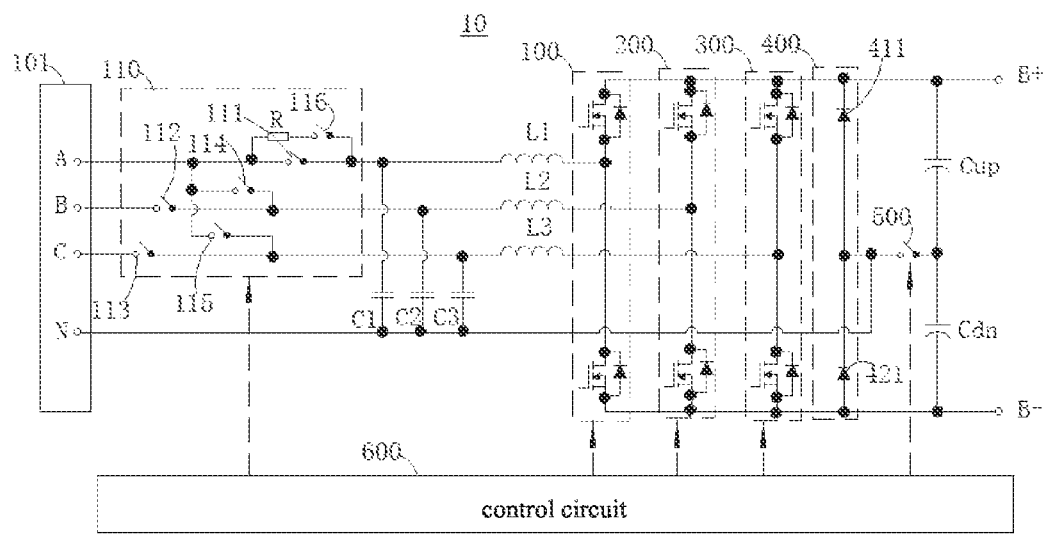
FIG. 4 is a schematic circuit diagram III of an on-board charger according to an embodiment of the present disclosure.

In some embodiments, as shown in FIG. 4, the fourth bridge arm 400 can include only the first diode 411 and the second diode 421 connected in series, but not the controllable switch. The cathode of the first diode 411 is electrically connected to the positive voltage bus B+, and the anode of the first diode 411 is electrically connected to the neutral node N and the first end of the first switch 500. The cathode of the second diode 421 is electrically connected to the anode of the first diode 411, and the anode of the second diode 421 is electrically connected to the negative voltage bus B−. At this time, the fourth bridge arm 400 can only perform a unidirectional operation, that is, only has a single-phase charging function, but not a single-phase discharging function. It can be seen from the above, unidirectional flow or bidirectional flow of energy can be realized through different configurations of the fourth bridge arm 400, and then the cost is optimized. In other embodiments, the upper bridge arm switch and the lower bridge arm switch can also consist only of the controllable switches.

Figure 5:
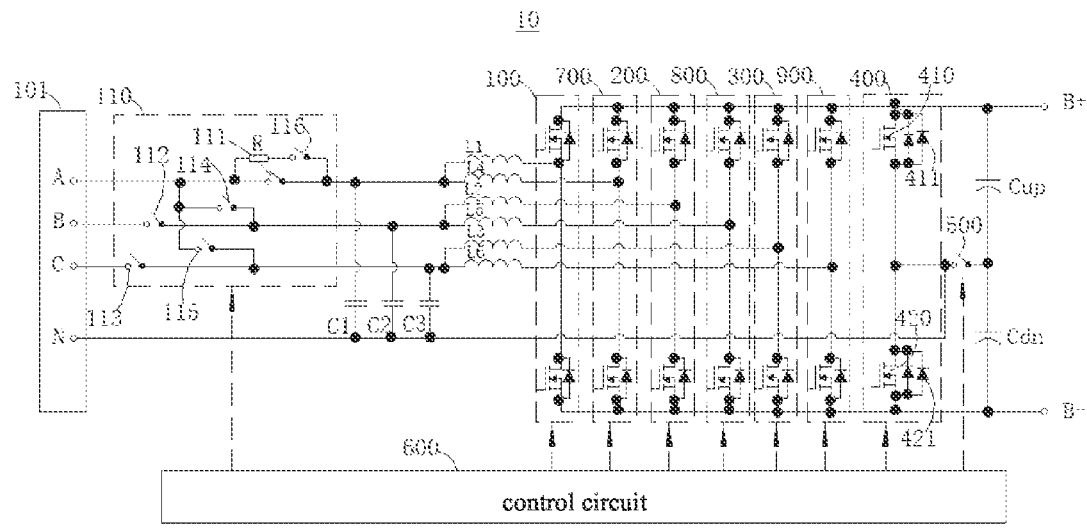
FIG. 5 is a schematic circuit diagram IV of an on-board charger according to an embodiment of the present disclosure.

In some embodiments, as shown in FIG. 5, the on-board charger 10 can further include a fifth bridge arm 700, a sixth bridge arm 800, and a seventh bridge arm 900. A first end of the fifth bridge arm 700 is electrically connected to the positive voltage bus B+, a second end of the fifth bridge arm 700 is electrically connected to the negative voltage bus B−, and a third end of the fifth bridge arm 700 is electrically connected to the fourth end of the switching circuit 110 through a fourth inductor L4. A first end of the sixth bridge arm 800 is electrically connected to the positive voltage bus B+, a second end of the sixth bridge arm 800 is electrically connected to the negative voltage bus B−, and a third end of the sixth bridge arm 800 is electrically connected to the fifth end of the switching circuit 110 through a fifth inductor L5. A first end of the seventh bridge arm 900 is electrically connected to the positive voltage bus B+, a second end of the seventh bridge arm 900 is electrically connected to the negative voltage bus B−, and a third end of the seventh bridge arm 900 is electrically connected to the sixth end of the switching circuit 110 through a sixth inductor L6. Each of the fifth bridge arm 700, the sixth bridge arm 800, and the seventh bridge arm 900 can include an upper bridge arm switch and a lower bridge arm switch connected in series. The switching circuit 110 in FIG. 5 has the same circuit topology and control manner as the switching circuit 110 in FIG. 3.

When the single-phase power supply is electrically connected to the power supply terminal 101, the first node A is electrically connected to the third end of the first bridge arm 100, the third end of the second bridge arm 200, the third end of the third bridge arm 300, the third end of the fifth bridge arm 700, the third end of the sixth bridge arm 800, and the third end of the seventh bridge arm 900. At this time, the control circuit 600 controls the first bridge arm 100, the second bridge arm 200, the third bridge arm 300, the fifth bridge arm 700, the sixth bridge arm 800, and the seventh bridge arm 900 to operate alternatively. The on-board charger 10 can charge at 22 KW in the single-phase mode, thereby increasing the charging power. When the three-phase power supply is electrically connected to the power supply terminal 101, the first node A is electrically connected to the third end of the first bridge arm 100 and the third end of the fifth bridge arm 700, the second node B is electrically connected to the third end of the second bridge arm 200 and the third end of the sixth bridge arm 800, and the third node C is electrically connected to the third end of the third bridge arm 300 and the third end of the seventh bridge arm 900. At this time, the control circuit 600 controls the first bridge arm 100 and the fifth bridge arm 700 to operate alternatively, and controls the second bridge arm 200 and the sixth bridge arm 800 to operate alternatively, and controls the third bridge arm 300 and the seventh bridge arm 900 to operate alternatively. The on-board charger 10 can charge at 22 KW in the three-phase mode.

Figure 6:
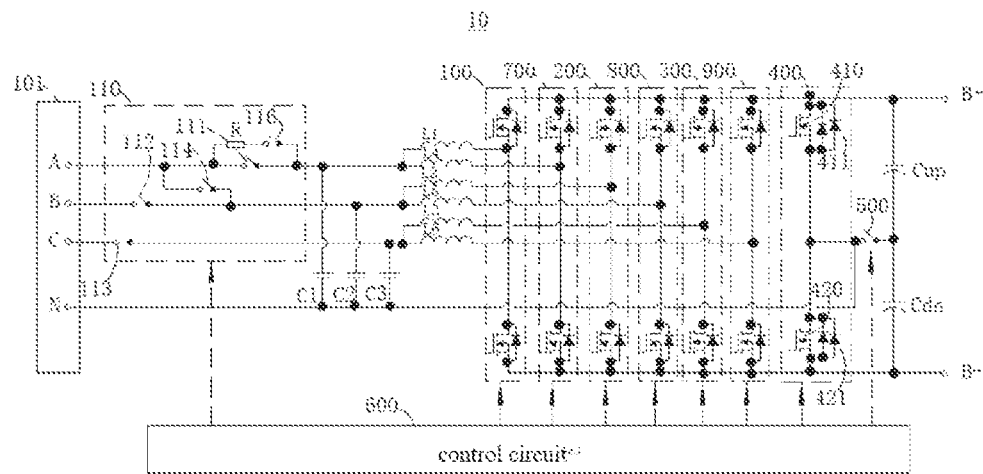
FIG. 6 is a schematic circuit diagram V of an on-board charger according to an embodiment of the present disclosure.

Referring to FIG. 6, which is a variant based on FIG. 5, with the sixth switch 115 removed from FIG. 5, the rest of the circuit is the same as the embodiment shown in FIG. 5. The switching circuit 110 in FIG. 6 has the same circuit topology and control manner as the switching circuit 110 in FIG. 2. Specifically, when the single-phase power supply is electrically connected to the power supply terminal 101, the control circuit 600 can control the switching circuit 110 to switch, such that the first node A is electrically connected to the first bridge arm 100, the second bridge arm 200, the fifth bridge arm 700, and the sixth bridge arm 800. At this time, the control circuit 600 controls the first bridge arm 100, the second bridge arm 200, the fifth bridge arm 700, and the sixth bridge arm 800 to operate alternatively. When the three-phase power supply is electrically connected to the power supply terminal 101, the control circuit 600 can control the switching circuit 110 to switch, such that the first node A is electrically connected to the third end of the first bridge arm 100 and the third end of the fifth bridge arm 700, the second node B is electrically connected to the third end of the second bridge arm 200 and the third end of the sixth bridge arm 800, and the third node C is electrically connected to the third end of the third bridge arm 300 and the third end of the seventh bridge arm 900. At this time, the control circuit 600 controls the first bridge arm 100 and the fifth bridge arm 700 to operate alternatively, controls the second bridge arm 200 and the sixth bridge arm 800 to operate alternatively, and controls the third bridge arm 300 and the seventh bridge arm 900 to operate alternatively.

In the above embodiments, the on-board charger 10 can further include a first filter capacitor C1, a second filter capacitor C2, and a third filter capacitor C3. A first end of the first filter capacitor C1 is electrically connected to the fourth end of the switching circuit 110, and a second end of the first filter capacitor C1 is electrically connected to the neutral node N. A first end of the second filter capacitor C2 is electrically connected to the fifth end of the switching circuit 110, and a second end of the second filter capacitor C2 is electrically connected to the neutral node N. A first end of the third filter capacitor C3 is electrically connected to the sixth end of the switching circuit 110, and a second end of the third filter capacitor C3 is electrically connected to the neutral node N. By filtering actions of the first filter capacitor C1, the second filter capacitor C2 and the third filter capacitor C3, high-frequency harmonic waves in circuit can be filtered out to reduce contamination to the power grid.

In the above embodiments, the switching circuit 110 further includes a resistor R and a seventh switch 116 which are used for pre-charging. A first end of the resistor R is electrically connected to the first node A, and a second end of the resistor R is electrically connected to a first end of the seventh switch 116. A second end of the seventh switch 116 is electrically connected to the second end of the second switch 111, and is electrically connected to the third end of the first bridge arm through the first inductor L1. The seventh switch 116 can be an intelligent switch or a relay switch. When the power supply terminal 101 is electrically connected to an AC power supply, the control circuit 600 first controls the seventh switch 116 to turn on and performs current limiting through the resistor R, thereby realizing the pre-charging of the first bus capacitor Cup and the second bus capacitor Cdn. When the pre-charging is completed, the control circuit 600 controls the seventh switch 116 to turn off and controls actions of the switches in the switching circuit 110.

In light of the above, the present disclosure can realize a compatibility of the single-phase power supply input or the three-phase power supply input through the cooperation of the switching circuit 110 and the control circuit 600. Meanwhile, by adding the fourth bridge arm 400 on the basis of the first bridge arm 100, the second bridge arm 200 and the third bridge arm 300, and by cooperating with the first switch 500, the first bus capacitor Cup and the second bus capacitor Cdn, accordingly the number of bus capacitors is reduced in the operating state of the single-phase power supply input, and then not only the volume and cost of the on-board charger 10 can be reduced, but also the charging power of the on-board charger 10 can be increased, which has an advantage of strong applicability.

The technical features of the above-mentioned embodiments can be combined in any way. For the sake of concise description, not all possible combinations of the technical features in the above-mentioned embodiments are described. However, as long as there is no contradiction between the combinations of these technical features, the combinations should be considered as the scope of the present disclosure.

The foregoing embodiments are merely several specific implementations of the present disclosure, and not interpreted as limiting the scope of the present disclosure. It should be noted that those skilled in the art can make any variations or improvements without departing from the concept of the present disclosure, and those variations and improvements shall all fall in the protection scope of the present disclosure. Therefore, the protection scope of the present disclosure shall be subject to the appended claims.

What is claimed is:

1. An on-board charger, comprising:
a power supply terminal comprising a first node, a second node, a third node, and a neutral node;
a switching circuit, wherein a first end of the switching circuit is electrically connected to the first node, a second end of the switching circuit is electrically connected to the second node, and a third end of the switching circuit is electrically connected to the third node;
a first bridge arm, wherein a first end of the first bridge arm is electrically connected to a positive voltage bus, a second end of the first bridge arm is electrically connected to a negative voltage bus, and a third end of the first bridge arm is electrically connected to a fourth end of the switching circuit;
a second bridge arm, wherein a first end of the second bridge arm is electrically connected to the positive voltage bus, a second end of the second bridge arm is electrically connected to the negative voltage bus, and a third end of the second bridge arm is electrically connected to a fifth end of the switching circuit;
a third bridge arm, wherein a first end of the third bridge arm is electrically connected to the positive voltage bus, a second end of the third bridge arm is electrically connected to the negative voltage bus, and a third end of the third bridge arm is electrically connected to a sixth end of the switching circuit;
a fourth bridge arm, wherein a first end of the fourth bridge arm is electrically connected to the positive voltage bus, a second end of the fourth bridge arm is electrically connected to the negative voltage bus, and a third end of the fourth bridge arm is electrically connected to the neutral node;
a first bus capacitor, wherein a first end of the first bus capacitor is electrically connected to the positive voltage bus;
a second bus capacitor, wherein a first end of the second bus capacitor is electrically connected to a second end of the first bus capacitor, and a second end of the second bus capacitor is electrically connected to the negative voltage bus;
a first switch, wherein a first end of the first switch is electrically connected to the third end of the fourth bridge arm, and a second end of the first switch is electrically connected to the second end of the first bus capacitor and the first end of the second bus capacitor; and
a control circuit configured to control the switching circuit, the first bridge arm, the second bridge arm, the third bridge arm and the first switch to operate;
wherein the switching circuit comprises:
a second switch, wherein a first end of the second switch is electrically connected to the first node, and a second end of the second switch is electrically connected to the third end of the first bridge arm through a first inductor;
a third switch, wherein a first end of the third switch is electrically connected to the second node, and a second end of the third switch is electrically connected to the third end of the second bridge arm through a second inductor;
a fourth switch, wherein a first end of the fourth switch is electrically connected to the third node, and a second end of the fourth switch is electrically connected to the third end of the third bridge arm through a third inductor; and
a fifth switch, wherein a first end of the fifth switch is electrically connected to the first node, and a second end of the fifth switch is electrically connected to the second end of the third switch;
wherein when a single-phase power supply is electrically connected to the power supply terminal, the control circuit controls the second switch and the fifth switch to turn on, and controls the third switch and the fourth switch to turn off, and the control circuit controls the first switch to turn off; and
when a three-phase power supply is electrically connected to the power supply terminal, the control circuit controls the second switch, the third switch and the fourth switch to turn on, and controls the fifth switch to turn off, and the control circuit controls the first switch to turn on.

2. The on-board charger of claim 1, wherein when the single-phase power supply is electrically connected to the power supply terminal, the control circuit controls the first bridge arm and the second bridge arm to operate alternatively.

3. The on-board charger of claim 1, wherein the switching circuit further comprises:
a sixth switch, wherein a first end of the sixth switch is electrically connected to the first node, and a second end of the sixth switch is electrically connected to the second end of the fourth switch.

4. The on-hoard charger of claim 3, wherein
when the single-phase power supply is electrically connected to the power supply terminal, the control circuit controls the sixth switch to turn on; and
when the three-phase power supply is electrically connected to the power supply terminal, the control circuit controls the sixth switch to turn off.

5. The on-board charger of claim 4, wherein when the single-phase power supply is electrically connected to the power supply terminal, the control circuit controls the first bridge arm, the second bridge arm and the third bridge arm to operate alternatively.

6. The on-board charger of claim 1, wherein the fourth bridge arm comprises:
an upper bridge arm switch, wherein a first end of the upper bridge arm switch is electrically connected to the positive voltage bus, and a second end of the upper bridge arm switch is electrically connected to the neutral node and the first end of the first switch; and
a lower bridge arm switch, wherein a first end of the lower bridge arm switch is electrically connected to the second end of the upper bridge arm switch, and a second end of lower bridge arm switch is electrically connected to the negative voltage bus.

7. The on-board charger of claim 6, wherein the upper bridge arm switch comprises at least one of a first controllable switch and a first diode; and the lower bridge arm switch comprises at least one of a second controllable switch and a second diode.

8. The on-board charger of claim 1, further comprising:
a fifth bridge arm, wherein a first end of the fifth bridge arm is electrically connected to the positive voltage bus, a second end of the fifth bridge arm is electrically connected to the negative voltage bus, and a third end of the fifth bridge arm is electrically connected to the fourth end of the switching circuit through a fourth inductor;
a sixth bridge arm, wherein a first end of the sixth bridge arm is electrically connected to the positive voltage bus, a second end of the sixth bridge arm is electrically connected to the negative voltage bus, and a third end of the sixth bridge arm is electrically connected to the fifth end of the switching circuit through a fifth inductor; and
a seventh bridge arm, wherein a first end of the seventh bridge arm is electrically connected to the positive voltage bus, a second end of the seventh bridge arm is electrically connected to the negative voltage bus, and a third end of the seventh bridge arm is electrically connected to the sixth end of the switching circuit through a sixth inductor.

9. The on-board charger of claim 8, wherein
when a single-phase power supply is electrically connected to the power supply terminal, the control circuit controls the first bridge arm, the second bridge arm, the third bridge arm, the fifth bridge arm, the sixth bridge arm and the seventh bridge arm to operate alternatively; and when a three-phase power supply is electrically connected to the power supply terminal, the control circuit controls the first bridge arm and the fifth bridge arm to operate alternatively, and controls the second bridge arm and the sixth bridge arm to operate alternatively, and controls the third bridge arm and the seventh bridge arm to operate alternatively.

10. The on-board charger of claim 8, wherein
when the single-phase power supply is electrically connected to the power supply terminal, the control circuit controls the first bridge arm, the second bridge arm, the fifth bridge arm and the sixth bridge arm to operate alternatively; and
when the three-phase power supply is electrically connected to the power supply terminal, the control circuit controls the first bridge arm and the fifth bridge arm to operate alternatively, and controls the second bridge arm and the sixth bridge arm to operate alternatively, and controls the third bridge arm and the seventh bridge arm to operate alternatively.

11. The on-board charger of claim 8, wherein each of the fifth bridge arm, the sixth bridge arm, and the seventh bridge arm comprises an upper bridge arm switch and a lower bridge arm switch connected in series.

12. The on-board charger of claim 1, further comprising:
a first filter capacitor, wherein a first end of the first filter capacitor is electrically connected to the fourth end of the switching circuit, and a second end of the first filter capacitor is electrically connected to the neutral node;
a second filter capacitor, wherein a first end of the second filter capacitor is electrically connected to the fifth end of the switching circuit, and a second end of the second filter capacitor is electrically connected to the neutral node; and
a third filter capacitor, wherein a first end of the third filter capacitor is electrically connected to the sixth end of the switching circuit, and a second end of the third filter capacitor is electrically connected to the neutral node.

13. The on-board charger of claim 1, wherein each of the first bridge arm, the second bridge arm, and the third bridge arm comprises an upper bridge arm switch and a lower bridge arm switch connected in series.

14. The on-board charger of claim 1, wherein the switching circuit further comprises:
a resistor, wherein a first end of the resistor is electrically connected to the first node; and
a seventh switch, wherein a first end of the seventh switch is electrically connected to a second end of the resistor, and a second end of the seventh switch is electrically connected to the second end of the second switch.

15. The on-board charger of claim 1, wherein the switching circuit comprises a plurality of switches, wherein the switch is a relay switch or an intelligent switch.

16. The on-board charger of claim 8, wherein the first bridge arm to the seventh bridge arm comprises an upper bridge arm switch and a lower bridge arm switch respectively, wherein the upper bridge arm switch and the lower bridge arm switch is an Insulated Gate Bipolar Transistor (IGBT) or a Metal-Oxide-Semiconductor Field-Effect Transistor (MOSFET).

17. The on-board charger of claim 4, wherein when the single-phase power supply is electrically connected to the power supply terminal, operating frequencies of the first bridge arm, the second bridge arm and the third bridge arm are high frequencies, and an operating frequency of the fourth bridge arm is a low frequency, the first bridge arm and the fourth bridge arm are equivalent to a full-bridge circuit, the second bridge arm and the fourth bridge arm are equivalent to a full-bridge circuit, the third bridge arm and the fourth bridge arm are equivalent to a full-bridge circuit.

18. An on-board charger, comprising:
a power supply terminal comprising a first node, a second node, a third node, and a neutral node;
a switching circuit, wherein a first end of the switching circuit is electrically connected to the first node, a second end of the switching circuit is electrically connected to the second node, and a third end of the switching circuit is electrically connected to the third node;
a first bridge arm, wherein a first end of the first bridge arm is electrically connected to a positive voltage bus, a second end of the first bridge arm is electrically connected to a negative voltage bus, and a third end of the first bridge arm is electrically connected to a fourth end of the switching circuit;
a second bridge arm, wherein a first end of the second bridge arm is electrically connected to the positive voltage bus, a second end of the second bridge arm is electrically connected to the negative voltage bus, and a third end of the second bridge arm is electrically connected to a fifth end of the switching circuit;
a third bridge arm, wherein a first end of the third bridge arm is electrically connected to the positive voltage bus, a second end of the third bridge arm is electrically connected to the negative voltage bus, and a third end of the third bridge arm is electrically connected to a sixth end of the switching circuit;
a fourth bridge arm, wherein a first end of the fourth bridge arm is electrically connected to the positive voltage bus, a second end of the fourth bridge arm is electrically connected to the negative voltage bus, and a third end of the fourth bridge arm is electrically connected to the neutral node;
a first bus capacitor, wherein a first end of the first bus capacitor is electrically connected to the positive voltage bus;
a second bus capacitor, wherein a first end of the second bus capacitor is electrically connected to a second end of the first bus capacitor, and a second end of the second bus capacitor is electrically connected to the negative voltage bus;
a first switch, wherein a first end of the first switch is electrically connected to the third end of the fourth bridge arm, and a second end of the first switch is electrically connected to the second end of the first bus capacitor and the first end of the second bus capacitor; and
a control circuit configured to control the switching circuit, the first bridge arm, the second bridge arm, the third bridge arm and the first switch to operate;
wherein the on-board charger further comprises:
a fifth bridge arm, wherein a first end of the fifth bridge arm is electrically connected to the positive voltage bus, a second end of the fifth bridge arm is electrically connected to the negative voltage bus, and a third end of the fifth bridge arm is electrically connected to the fourth end of the switching circuit through a fourth inductor;
a sixth bridge arm, wherein a first end of the sixth bridge arm is electrically connected to the positive voltage bus, a second end of the sixth bridge arm is electrically connected to the negative voltage bus, and a third end of the sixth bridge arm is electrically connected to the fifth end of the switching circuit through a fifth inductor; and
a seventh bridge arm, wherein a first end of the seventh bridge arm is electrically connected to the positive voltage bus, a second end of the seventh bridge arm is electrically connected to the negative voltage bus, and a third end of the seventh bridge arm is electrically connected to the sixth end of the switching circuit through a sixth inductor.

* * * * *